Patented July 13, 1954

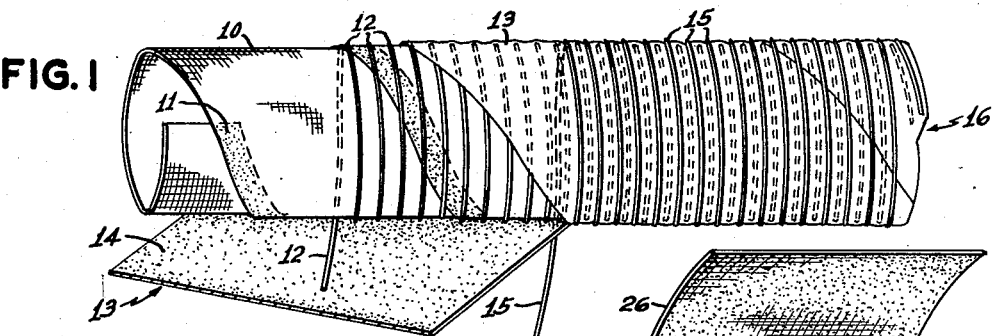
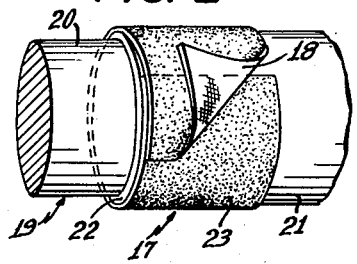
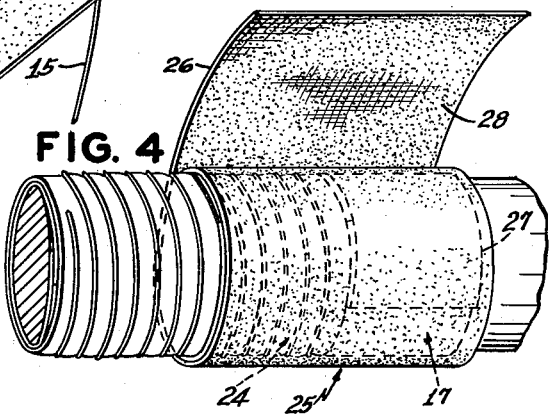
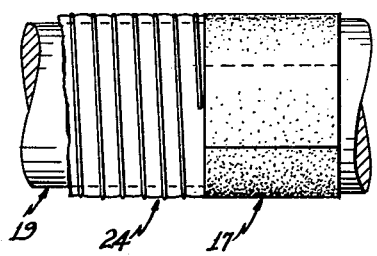
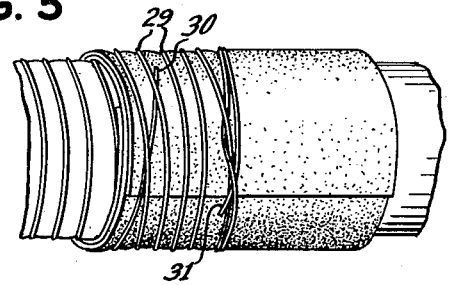
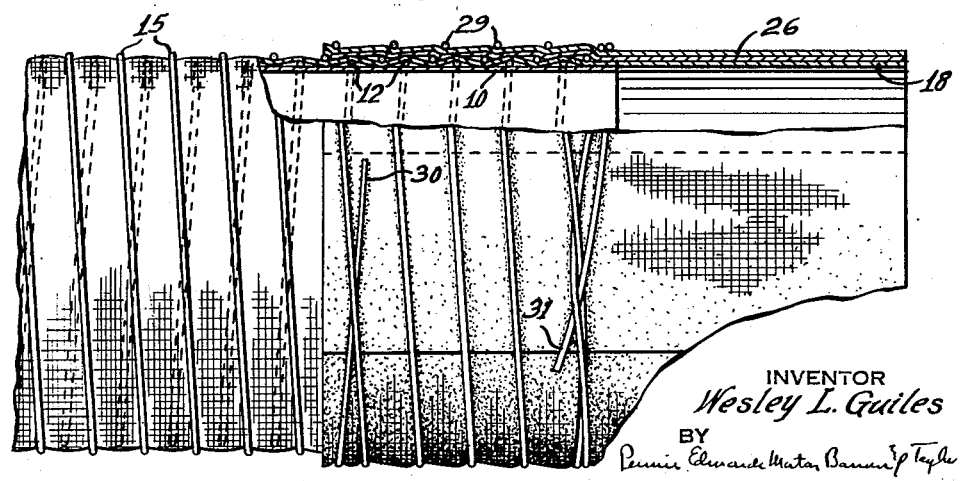
INVENTOR
Wesley L. Guiles

2,683,466

UNITED STATES PATENT OFFICE 2,683,466

CUFF FOR FLEXIBLE TUBING

Wesley L. Guiles, Guilford, Conn., assignor to
The Flexible Tubing Corporation, Guilford,
Conn., a corporation of Connecticut Application February 14, 1952, Serial No. 271,539

5 Claims. (Cl. 138—25)

This invention relates to the attachment of cuffs to flexible tubing, especially to flexible tubing having a body of fabric or equivalent pliable material formed about a supporting wire helix. The cuff is a short tubular section of fabric at the end of the length of tubing, which is unsupported by the wire helix. It provides for clamping the end portion of the flexible tubing tightly to a length of rigid pipe, or to any device in connection with which the flexible tubing is used.

It is imperative that the cuff be very securely joined to the flexible tubing itself, for the security with which the tubing may be attached in place is dependent on the security of attachment of the cuff to the tubing. It has heretofore been considered that the best way to meet the requirements imposed on the cuff is to apply it at the factory, making a portion of the cuff integral with the body of the tubing. This procedure, of course, results in a cuff of excellent quality, but it has the very serious disadvantage that the tubing user must purchase the tubing cut to exact lengths and with cuffs attached.

There has long been a need, heretofore unmet, for a practical cuff which can be applied by semi-skilled operators at the plant of the tubing user, for it then becomes possible for the user to purchase tubing in long lengths and to cut it to whatever relatively short lengths are required for each particular job.

The present invention provides an assembly of tubing and cuff which can be made without special tools (other than a mandrel for insertion into the end of the tubing), and which has been found to meet all normal cuff requirements. The invention further provides the method by which the new cuff is assembled with and secured to the end of the tubing.

The assembly of the invention comprises a short unsupported tubular cuff joined to the end portion of a length of flexible tubing having a body of pliable sheet material supported in open tubular form by a wire helix. In this assembly, a cuff inner ply in the form of a strip of pliable sheet material is formed into a cylinder of essentially the same outside diameter as the tubing, and is abutted against the end of said tubing. A cuff outer ply in the form of a strip of pliable sheet material is applied in surrounding relation about both said cuff inner ply and the abutting end portion of the tubing, and is adhesively bonded to both said inner ply and said tubing end portion. Then, a cord is wrapped tightly about the cuff outer ply where it overlies the end portion of the tubing, such cord being laid on helically between the turns of the supporting wire helix.

A preferred embodiment of the invention is described below in conjunction with the accompanying drawings, in which:

Fig. 1 shows a length of tubing (in partially disassembled form to show its construction) to which a cuff is to be applied;

Fig. 2 shows the cuff inner ply being prepared on a mandrel;

Fig. 3 shows the cuff inner ply held in abutting relation with the end portion of the tubing by the mandrel;

Fig. 4 shows the cuff outer ply as it is being laid on the cuff inner ply and the abutting end portion of the tubing;

Fig. 5 shows the cuff and tubing assembly after application of the cord wrapping about the cuff outer ply; and Fig. 6 is an elevation, partially in section and on an enlarged scale, of the completed assembly of cuff and adjoining end portion of the tubing.

The tubing illustrated in Fig. 1, with which a cuff is to be assembled in accordance with the invention, comprises an inner ply 10 in the form of a strip of fabric that has been wrapped helically into tubular form with its edges overlapping and secured together by a film of adhesive 11. (Instead of being wrapped helically as shown, the strip of fabric forming the inner ply 10 may be wrapped longitudinally with its edges overlapping to form a longitudinal seam.) A wire 12, preferably but not limited to a rather stiff steel wire, is wound helically about the inner ply 10, and a strip of fabric 13 is wound helically about the wire 12. This latter strip forms the outer ply of the tubing wall, and is joined by a film of adhesive 14, through the spaces between the turns of the wire helix, to the inner ply 10. The tubing is completed by a cord 15 which is wrapped helically about its outer ply between the turns of the wire helix.

The first step in the assembly of a cuff with the tubing of Fig. 1 is to cut the tubing to the proper length. This is accomplished by severing the fabric body of the tubing, completely about is circumference, between turns of the wire helix, and then cutting through the wire between the ends of the circumferential cut about the tubing wall, the end of the thus-cut tubing having substantially the appearance indicated at 16 of Fig. 1. The end portion of the supporting wire 13 at the cut end is traced back about one-half to one full turn of the helix and there is cut off (through the outer ply fabric 13) so that the wire terminates at a point where it is well anchored between the two fabric plies of the tubing wall. Then the fabric at the end of the tubing is advantageously trimmed square with the tubing axis.

The first step in the preparation of the cuff itself is to form the cuff inner ply 17 (see Fig. 2) by wrapping a strip of textile fabric or equivalent pliable sheet material 18 into the form of a cylinder having substantially the same outside diameter as the tubing with which the cuff is to be assembled. It is most convenient to form the cuff inner ply by wrapping the material 18 about a cylindrical mandrel 19. One end portion 20 of the mandrel has an outside diameter substantially equal to the inside diameter of the tubing, so that it may be fitted snugly but with ease into the end portion of the tubing. The other end portion 21 of the mandrel may advantageously be enough larger in diameter so that when the cuff inner ply is formed thereon it will have essentially the same outside diameter as the tubing. A narrow peripheral shoulder 22 where the larger end portion 21 of the mandrel joins with the smaller end portion 20 thereof provides a convenient guide for assuring that the edges of the cuff inner ply are aligned square with its axis when the material 18 is wrapped about the mandrel.

The material 18 is coated on its outside surface with a film of adhesive 23, and its overlapping ends are adhesively joined together thereby. This film of adhesive may be applied to the material 18 at the time the cuff inner ply is formed, or the cuff inner ply may be assembled from an adhesive-coated material which needs only to be moistened with a solvent to render the adhesive tacky.

Next the small-diameter end portion 20 of the mandrel 19 is inserted into the end portion 24 of the tubing, as shown in Fig. 3. The tubing is brought up on the mandrel far enough to abut against the mandrel shoulder 22 and against the edge of the cuff inner ply 17.

In the next step (Fig. 4), a cuff outer ply 25 is formed by wrapping a strip of textile fabric or other pliable material 26 about both the cuff inner ply 17 and the adjoining end portion 24 of the tubing. The strip of material 26 which forms the cuff outer ply is preferably considerably wider than the inner ply 17, and it is preferably applied with one edge in alignment with the outer or exposed edge 27 of the cuff inner ply. Thus the cuff outer ply overlies the inner ply throughout its entire length and also overlies a considerable end portion length of the tubing. The cuff outer ply is coated preferably on both surfaces with films of adhesive 28, and the end portion 24 of the tubing advantageously is also coated with adhesive. Such adhesive may be applied coincidentally with wrapping the material 26 into place; or the material 26 may be of fabric that has been pre-coated with an adhesive composition which can be rendered tacky by the application of a solvent just prior to wrapping the material of the cuff outer ply into place.

If desired, the cuff outer ply may comprise a single turn of the material 26 about the cuff inner ply and about the adjoining end portion of the tubing; but preferably it comprises two full turns of the material 26 about the tubing. The films of adhesive 23 on the cuff inner ply and 28 on the material of the cuff outer ply serve to bond the cuff inner ply 17, the tubing end portion 24, and the several turns of the cuff outer ply all together. By pulling up tightly on the strip of material 26 as it is wrapped into place, a secure and substantially fluid tight adhesive joint can be formed between the tubing and the cuff.

To insure a mechanically strong attachment of the cuff to the tubing, a cord 29 is wrapped helically about the cuff outer ply where it overlies the end portion of the tubing, between the turns of the supporting wire helix. The starting end portion 30 of the cord 29 is held in place by overlaying it with the first turn or two of the cord about the cuff outer ply; and its other end 31 is secured in place by finishing off the cord wrapping with one or two half-hitches. The adhesive coating 28 on the outside surface of the cuff outer ply bonds the cord 29 in place and insures against having it work loose in any normal use of the tubing.

The cord 29 should be applied tightly enough so that the cuff outer ply is forced tightly against the fabric of the tubing outer ply between adjacent turns of the wire helix. Thereby a positive mechanical interlocking of the cuff outer ply with the tubing is achieved, and the adhesive bonding of the cuff outer ply to the tubing is relieved of having to provide the whole of the mechanical strength of the joint between tubing and cuff outer ply.

In the cuff and tubing assembly shown in the drawings, the cord 29 which is wrapped helically about the cuff outer ply is separate from the cord 15 which is wrapped helically about the material 13 forming the outer ply of the tubing wall. In this case, the end of the cord 15 is adhesively anchored between the outer ply of the tubing wall and the overlying cuff outer ply 25. If desired, however, the cord 15 may be unwrapped from the end portion 24 of the tubing before wrapping the strip of material 26 into place to form the cuff outer ply. Then the cord 15 may be rewrapped tightly, bringing it up over the outer surface of the cuff outer ply 25 to take the place and perform the function of the cord 29.

If the adhesive which coats the outer surface of the cuff outer ply 25 tends to remain tacky for any considerable period of time, the cuff assembly may be dusted with mica dust, soapstone, talc, or the like. Also, if an adhesive in the nature of an unvulcanized rubber composition or a thermosetting synthetic resin composition is used, the cuff assembly may have to be heated in an oven to the best temperature for causing the adhesive to set.

It has been found in actual practice that cuff assemblies of the character herein described can be made quickly by semi-skilled factory workers; and it has been found that cuffs thus made are for most purposes fully as satisfactory as factory-made cuffs of the character heretofore considered to be the only practical kind to employ. The new cuff assembly can be prepared with no other tools than a suitable mandrel, ordinary wire-cutters, and a brush or swab to apply the adhesive or adhesive solvent to the cuff material. The mandrel itself is a simple cylindrical object which can be prepared without difficulty for any desired size of tubing. The ease of preparing the new cuff assembly, and its mechanical strength and fluidtightness, combine to make it as practical for most uses as the factory-applied cuffs it replaces. At the same time, the principal disadvantage of the factory-applied cuff—the need for the tubing user to purchase his tubing requirements cut to predetermined length and with cuff attached—is eliminated.

I claim:

1. The assembly with a length of flexible tubing having a body of pliable sheet material supported in open tubular form by a wire helix, of a short unsupported tubular cuff, said assembly comprising a cuff inner ply in the form of a strip of pliable sheet material formed into a cylinder of essentially the same outside diameter as said tubing and abutting the end of said tubing, a cuff outer ply in the form of a strip of pliable sheet material tightly surrounding both said cuff inner ply and the abutting end portion of the tubing, said cuff outer ply being adhesively bonded to both the cuff inner ply and the end portion of the tubing, and a wrapping of cord applied tightly about said cuff outer ply where it overlies the end portion of said tubing, said cord wrapping being laid on helically between the turns of the supporting wire helix.

2. The combination with a length of flexible tubing comprising a fabric inner ply, a supporting wire helix, a fabric outer ply adhesively joined through the turns of said helix to said fabric inner ply, and a helical cord binding surrounding said outer ply between the turns of said supporting wire helix, of a short unsupported tubular cuff comprising a cylindrical fabric cuff inner ply of essentially the same outside diameter as the fabric outer ply of the tubing, said cuff inner ply being mounted in abutting relation with the end of said tubing, a cylindrical fabric cuff outer ply fitted closely about said cuff inner ply and also about the adjacent end portion of said tubing, said cuff outer ply being adhesively bonded both to said cuff inner ply and to said tubing end portion, and a wrapping of cord applied tightly about said cuff outer ply where it overlies the end portion of said tubing, said cord wrapping being laid on helically between the turns of the supporting wire helix.

3. The method of preparing and attaching an unsupported cuff of pliable sheet material to a length of flexible tubing having a body of pliable sheet material wound into tubular form and held in such form by a supporting wire helix, which comprises forming a strip of pliable sheet material into a cuff inner ply cylinder of essentially the same outside diameter as said tubing, mounting said cuff inner ply cylinder in abutting relation with the end of said tubing, applying a film of adhesive to the outer surfaces of both said cuff inner ply cylinder and the adjoining end portion of the tubing, surrounding said cuff inner ply and said tubing end portion with a cuff outer ply by tightly applying a strip of pliable sheet material about the adhesive coated surfaces thereof, whereby said cuff outer ply becomes adhesively bonded to both the cuff inner ply and the end portion of the tubing, and wrapping a cord tightly about said cuff outer ply where it overlies said tubing end portion, said cord wrapping being laid on helically between the turns of the supporting wire helix.

4. The method of preparing and attaching an unsupported cuff of pliable sheet material to the end portion of a length of flexible tubing comprising a fabric inner ply, a supporting wire helix, and a fabric outer ply adhesively joined through the turns of said helix to said fabric inner ply, which comprises wrapping a strip of textile fabric into the form of a cylindrical cuff inner ply having essentially the same outside diameter as said tubing, mounting said cuff inner ply in abutting relation with the end of said tubing, wrapping a strip of textile fabric of width substantially greater than said cuff inner ply closely about said cuff inner ply and also about the adjacent end portion of said tubing, adhesively bonding the inner surface of said cuff outer ply to the adjoining outer surfaces of said cuff inner ply and said tubing end portion, and wrapping a cord tightly about said cuff outer ply where it overlies and is bonded to said tubing end portion, said cord wrapping being laid on helically between the turns of the supporting wire helix.

5. The method of preparing and attaching an unsupported cuff of pliable sheet material to the end portion of a length of flexible tubing comprising a fabric inner ply, supporting wire helix, and a fabric outer ply adhesively joined through the turns of said helix to said fabric inner ply, which comprises squaring the end of said tubing, inserting into the end portion of said tubing a mandrel having substantially the same outside diameter as the inside diameter of said tubing, wrapping about said mandrel a strip of fabric material, thereby to form a cylindrical fabric cuff inner ply, arranging said cuff inner ply on the mandrel in abutting relation with the end portion of said tubing, applying a film of adhesive over the outer surface of said cuff inner ply and over the outer surface of the adjacent end portion of the tubing, wrapping a strip of fabric substantially wider than said cuff inner ply tightly about the adhesive coated surfaces of both the cuff inner ply and the tubing end portion, thereby to form a cuff outer ply, said cuff outer ply being applied with one edge thereof substantially in alignment with the exposed edge of the cuff inner ply, wrapping a cord tightly about said cuff outer ply where it overlies said tubing end portion, said cord wrapping being laid on helically between the turns of the supporting wire helix, and thereafter withdrawing the mandrel from the interior of the tubing.

References Cited in the file of this patent

UNITED STATES PATENTS

| Number | Name | Date |
|---|---|---|
| 7,413 X | Riley | Feb. 6, 1833 |
| 986,081 | Patterson | Mar. 7, 1911 |
| 1,919,734 | Kyle et al. | July 25, 1933 |
| 2,392,992 | Martin | Jan. 15, 1946 |
| 2,396,059 | Roberts | Mar. 5, 1946 |
| 2,430,630 | Davis, Jr. | Nov. 11, 1947 |
| 2,475,389 | Hersey, Jr. | July 5, 1949 |